Jan. 29, 1924.
G. F. COLLEY
ANTIRATTLER
Filed Nov. 24, 1923
1,482,286
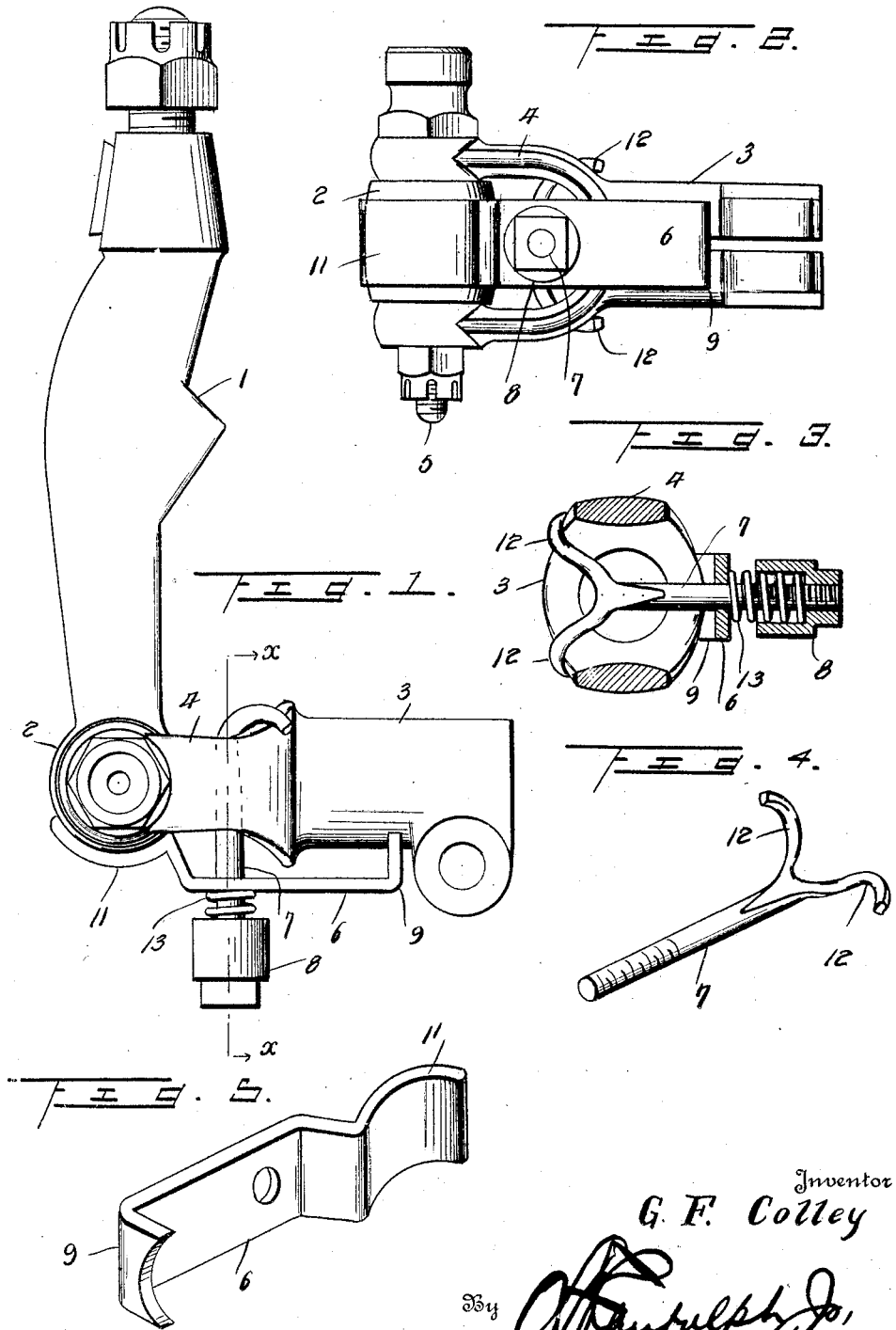
Inventor
G. F. Colley
By [signature]
Attorney Patented Jan. 29, 1924.

1,482,286

UNITED STATES PATENT OFFICE.

GEORGE F. COLLEY, OF ATHENS, GEORGIA, ASSIGNOR TO WARREN J. CONOLLY, OF ATHENS, GEORGIA.

ANTIRATTLER.

Application filed November 24, 1923. Serial No. 676,873.

*To all whom it may concern:*

Be it known that I, GEORGE F. COLLEY, a citizen of the United States, residing at Athens, in the county of Clarke and State of Georgia, have invented certain new and useful Improvements in Antirattlers; and I do hereby declare the following to be a full, clear, and exact description of the invention, such as will enable others skilled in the art to which it appertains to make and use the same.

The joint of relatively movable parts, such as the arms of steering knuckles and the links connecting such arms, of motor vehicle become worn and the resultant play produces an unpleasant and annoying noise which it is the purpose of the present invention to avoid by the provision of means automatic in action to take up and prevent relative play in the joints.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of the specification,

Figure 1 is a top plan view of the joint between the arm of a steering knuckle and the link associated therewith illustrating the application of the invention.

Figure 2 is an elevation of the parts shown in Figure 1.

Figure 3 is a detail section on the line *x—x* of Figure 1 looking in the direction of the arrows.

Figure 4 is a detail view of the bolt in perspective, and

Figure 5 is a detail perspective view of the spring.

Corresponding and like parts are referred to in the following description and designated in the several views of the drawing by like reference characters.

The numeral 1 designates the arm of a steering knuckle or other part of a motor vehicle provided at one end with a sleeve 2. The numeral 3 designates a link or like part having a fork 4 at one end which receive the sleeve 2 which is pivotally connected thereto by means of a bolt 5 or other type of fastening. The sleeve 2 is received between the element of the fork 4 and the pivot fastening 5 extends through registering openings to pivotally connect the parts 1 and 3. The joint illustrated is of ordinary construction and demonstrates the application of the invention which consists of a spring 6, bolt 7 and nut 8.

The spring 6 is flat and comparatively stout to automatically take up wear and prevent rattle in the joint. One end of the spring 6 is off set as indicated at 9 to engage a side of the link 3 or like part. The engaging edge of the offset end 9 is concave to fit the curved side of the link 3. The opposite end portion of the spring 6 is curved, as indicated at 11, to snugly fit the outer side of the sleeve 2 so as to obtain an extended bearing thereon. The bolt 7 is adapted to pass through an opening formed in the spring 6 and one end thereof is provided with curved branches 12 which engage the elements of the form 4. The end of the bolt 7 projecting beyond the spring 6 is threaded and receives the nut 8 which is hollow and forms a housing for an expansible helical spring 13 mounted on the bolt 7 between the spring 6 and nut 8. The bolt 7 extends through the fork 4 and holds the spring 6 in position. Longitudinal movement of the spring being prevented chiefly by the curved end 11 thereof engaging the sleeve 2. Relative lateral displacement of the spring 6 is prevented by the bolt 7 and the concave extremity of the offset end 9 engaging the outer curved side of the link 3. The tension of the spring 6 is regulated by means of the nut 8 and is such as to prevent rattle of the joint between the parts 1 and 3 even though play should exist. Wear in the joint is automatically taken up by the spring 6 to prevent play and consequent noise or rattle.

Having thus described the invention, what I claim is:—

1. An anti rattler for the joints formed between parts, the one embodying a sleeve and the other a fork to receive the sleeve which is pivoted thereto, the same comprising a flat spring placed against a side of the fork member and having one end curved to snugly fit said sleeve, a bolt passing loosely through the spring and said fork and engaging the furcations thereof, and a nut threaded on the projecting end of the bolt and exerting a lateral pressure against the spring whereby to tension the same to automatically take up any wear in the joint and prevent rattle or noise.

2. An anti rattler for the joint between parts, the one embodying a sleeve and the other a fork between which said sleeve is pivoted, said means embodying a flat spring having one end laterally offset and concave in its outer edge and having its opposite end portion curved to snugly fit about the said sleeve, a bolt passing loosely through the spring and said fork and having curved branches engaging the element of the latter, and a nut mounted on the threaded end of the bolt and exerting a pressure on the spring to tension the same whereby to automatically take up wear in the joint.

In testimony whereof I affix my signature in presence of two witnesses.

GEORGE F. COLLEY.

Witnesses:
MAX RICHARD,
L. B. ETHERIDGE.